United States Patent
Bettencourt

[15] 3,677,620
[45] July 18, 1972

[54] CORRECTIVE MIRROR ASSEMBLY

[72] Inventor: Joseph Bettencourt, Albany, Calif.

[73] Assignees: John D. Pleich, Albany; Paul Holland, Berkeley, Calif.; part interest to each

[22] Filed: Nov. 20, 1967

[21] Appl. No.: 684,208

[52] U.S. Cl..............................350/145, 350/201, 350/250, 350/296, 350/298, 350/306
[51] Int. Cl..................G02b 27/02, G02b 17/00, G02b 7/18
[58] Field of Search..................350/145, 250, 296, 303, 306, 350/201, 298, 285, 293

[56] References Cited

UNITED STATES PATENTS

| | | | |
|---|---|---|---|
| 1,869,456 | 8/1932 | Bansch | 350/293 X |
| 2,582,227 | 1/1952 | Brady | 350/201 |
| 3,171,885 | 3/1965 | Moody | 350/201 |
| 1,989,973 | 2/1935 | Dimmick | 350/285 X |
| 3,051,049 | 8/1962 | Linke | 350/201 |
| 3,374,047 | 3/1968 | Gatchell | 350/250 X |

FOREIGN PATENTS OR APPLICATIONS

| | | | |
|---|---|---|---|
| 1,055,208 | 1/1967 | Great Britain | 350/201 |
| 702,793 | 1/1954 | Great Britain | 350/306 |

*Primary Examiner*—David Schonberg
*Assistant Examiner*—Paul A. Sacher
*Attorney*—Edward Brosler

[57] ABSTRACT

A lens-mirror device corresponding substantially to the spectacle lens optical requirements of an individual and corrected for use at a distance of the order of 20 centimeters from the individual's eyes, to facilitate makeup and other routine operations around the eyes and the adjacent areas of the face.

1 Claim, 3 Drawing Figures

Patented July 18, 1972  3,677,620

INVENTOR.
JOSEPH BETTENCOURT
BY
Edward Brosler
ATTORNEY

CORRECTIVE MIRROR ASSEMBLY

My invention relates to the field of mirrors and more particularly to a lens-mirror device for viewing areas of one's face particularly the eyes and surrounding regions.

The majority of women over the age of 45 have lost their focusing ability, and therefor encounter annoying visional problems when the attempt to make up their eyes and perform other cosmetic procedures on their faces. If they attempt to make up their eyes or faces without their glasses, they cannot see clearly, and the procedure becomes an annoying chore. If, on the other hand, they leave their glasses on, in an attempt to make up their eyes, the frames and lenses obstruct access to their eyes, making it quite difficult to work behind the lenses in performing these routines.

Simple concave mirrors have been made available, with the intent to enable one to perform makeup routines around the eyes and adjacent areas, without requiring the use of one's spectacles, such mirrors functioning solely to magnify the image of the areas to be worked on. If a person's eyes were widely different, it stands to reason that a magnifying mirror, suitable for use with one eye, will not be too satisfactory for use with the other. In many instances, it is conceivable, a conventional magnifying mirror will not be appropriate for either eye.

Among the objects of my invention are:

1. To provide a novel and improved device involving one to perform routine makeup operations or the like around the eyes or adjacent areas of the face, without requiring the use of one's spectacles;

2. To provide a novel and improved device involving a lens-mirror combination designed substantially to the optical characteristics of an eye, to enable performance of routine operations about the other eye and adjacent areas of one's face, without the need of spectacles; and 3. To provide a novel and improved device involving a pair of lens-mirror combinations capable of use in performing routine operations around the eyes and adjacent areas of one's face, without the need of spectacles.

Additional objects of my invention will be brought out in the following description of a preferred embodiment of the same, taken in conjunction with the accompanying drawings, wherein, FIG. 1 is a diagrammatic view, for use in explaining the underlying theory of the present invention in its preferred form;

Figure 1:
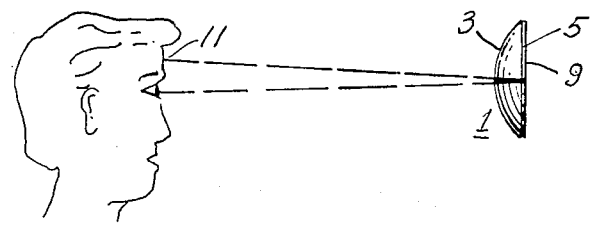

Referring to the drawings for details of my invention in its preferred form, I have illustrated in FIG. 1, a lens 1 of the plano-convex type, which would have a convex surface 3 and a plane surface 5. This lens, however, is not a simple lens, but is ground to substantially the optical characteristics of one of the lens of the spectacles of an individual, corrected to that distance from the eye of the individual, at which the lense is to be supported when in use.

Associated with the plane side of the lens, is a mirror, which may take the form of a coating 9 on the plane surface of the lens, or may constitute a conventional mirror in spaced relationship to this side of the lens.

An appropriate distance from the eye for supporting such lens-mirror combination when in use, would in most instances, correspond to such distance as one would use a conventional mirror, and this would be of the order of 20 centimeters.

In correcting for such distance, however, one must first evaluate the power of a mirrorless lens, located the same distance from the eye, and capable of focusing onto the retina, an image of an object twice such distance from the eye. When this has been determined, a similar lens, when associated with a mirror, will be ground to half the power.

An explanation of this, may be obtained from an analysis of the diagram of FIG. 1, wherein light from an area 11 above an eye is shown passing through the lens, which will refract the light before striking the mirror. Upon being reflected by the mirror, the light will again pass through the lens, where it will be refracted a second time before reaching the eye of the observer. Inasmuch as the lens without the mirror, achieves but one refraction of the light passing from the object to the eye, it follows that the power of a similar lens, when employed with the mirror, should be but one half that of the lens without the mirror, due to such double refraction.

With an arrangement as thus depicted in the diagrammatic view of FIG. 1, the viewer will achieve a perfect image through one eye, of that area of the face being viewed in the lens-mirror combination, and obviously, the area being viewed, may be the opposite eye and surrounding region.

If the other eye does not differ optically from the first eye in material respects, the same lens-mirror combination may be utilized to advantage, in working around the regions of either eye.

Should the eyes of the individual involve widely different optical characteristics, these will be reflected in the lenses of the spectacles of the individual, and a separate lens-mirror combination will be provided for each eye, patterned after the spectacle lens for such eye.

Each such lens-mirror combination will preferably be installed in its own receptacle 21, 23 which receptacles will then, preferably, be connected together by a hinge 25 with the centers of the lens-mirror combinations spaced apart to conform to the interpupillary distance of the individual.

In some cases, such distance may preferably be made adjustable, so as to accommodate cases where phoria may be present. Such latter adjustable feature will also be applicable to the field of vision training, because, by adjusting such distance between the centers of the two lens-mirror combinations, prism would be introduced.

Figure 2:
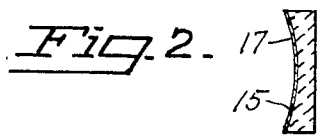
FIG. 2 depicts a different form of the invention.
Figure 3:
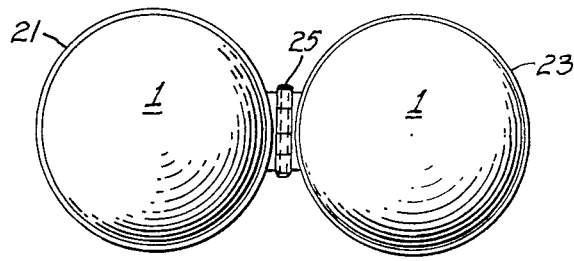
FIG. 3 is a view illustrating the invention in a practical form.

While I have disclosed my invention in its preferred form, as applied to a lens-mirror combination, in which the lens is of the plano-convex type, the lens may have curvature on both surfaces, and associated with a rear mirror, or, as illustrated in FIG. 2, the lens may have a concave front surface 15 with a mirror coating 17 thereon, it being understood that this lens will be patterned after the optical requirements of the eye it is to serve, or the pertinent spectacle lens, and prior to the application of the mirror coating.

The invention while it has been described from the viewpoint of its use for makeup purposes, obviously could be employed to advantage, in installing a contact lens, or for guidance in shaving, or even as an aid in removing foreign matter from one's eye.

From the foregoing description of my invention, it will be apparent that the same fulfills all the objects attributed thereto, and while I have illustrated and described the same in considerable detail, it will be apparent that the invention is subject to alteration and modification without departing from the underlying principals involved, and I, accordingly, do not desire to be limited in my protection to the specific details illustrated and described, except as may be necessitated by the appended claims.

I claim:

1. A corrective mirror assembly adapted to the needs of a specific individual who requires spectacles for close work, comprising a plano-convex means ground substantially to the optical characteristics of one of the lenses of the spectacles of such individual, said plano-convex lens means including a reflective mirror surface on the planar side of said plano-convex lens means and being ground to a power one-half that of a similar lens which would focus onto the retina of an eye of such individual, an object located twice the distance from said eye that said lens means is supported in use, a second plano-convex lens ground substantially to the optical characteristic of the remaining lens of the spectacles of said individual, said second lens means including a reflective mirror surface on the planar side of said second plano-convex lens means, said second lens means being ground to the power one-half that of a similar lens which would focus onto the retina of the other eye of said individual, an object located twice the distance from the said other eye that said lens means is, when supported in use, said distance from each eye being on the order of 20 centimeters, each of said plano-convex means being housed in its own respectacle with the convex surface facing said individual when in use, said receptacles being connected by hinge means such that the distance between centers of said lens-mirror combinations correspond substantially to the interpupillary distance of said individual.

* * * * *